(12) United States Patent
Hoehn

(10) Patent No.: US 8,430,779 B2
(45) Date of Patent: Apr. 30, 2013

(54) POWER-DIVIDING GEAR TRAIN ASSEMBLY FOR MOTOR VEHICLES

(75) Inventor: Bernd-Robert Hoehn, Munich (DE)

(73) Assignee: FZGmbH, Garching (DE)

( * ) Notice: Subject to any disclaimer, the term of this patent is extended or adjusted under 35 U.S.C. 154(b) by 687 days.

(21) Appl. No.: 12/595,194

(22) PCT Filed: Apr. 18, 2008

(86) PCT No.: PCT/EP2008/003148
§ 371 (c)(1),
(2), (4) Date: Oct. 8, 2009

(87) PCT Pub. No.: WO2008/125364
PCT Pub. Date: Oct. 23, 2008

(65) Prior Publication Data
US 2010/0167862 A1  Jul. 1, 2010

(30) Foreign Application Priority Data
Apr. 12, 2007 (DE) .......................... 10 2007 017 185

(51) Int. Cl.
*F16H 48/06* (2006.01)
(52) U.S. Cl.
USPC ........................................................ 475/225
(58) Field of Classification Search ............... 475/5, 6, 475/207, 221, 225, 248, 329–332
See application file for complete search history.

(56) References Cited

U.S. PATENT DOCUMENTS

| | | | |
|---|---|---|---|
| 5,387,161 A | 2/1995 | Shibahata | |
| 5,409,425 A | 4/1995 | Shibahata | |
| 5,518,463 A | 5/1996 | Shibahata et al. | |
| 7,588,511 B2 * | 9/2009 | Tangl et al. | 475/150 |
| 7,601,086 B2 * | 10/2009 | Rosemeier et al. | 475/5 |
| 8,012,057 B2 * | 9/2011 | Meixner | 475/6 |

FOREIGN PATENT DOCUMENTS

| | | |
|---|---|---|
| DE | 4314797 A1 | 11/1994 |
| DE | 102005021023 A1 | 11/2006 |
| JP | 06-300095 | 10/1994 |
| JP | 2007-177915 | 7/2007 |
| WO | 2006/010186 A | 2/2006 |
| WO | 2006/029434 | 5/2006 |

OTHER PUBLICATIONS

International Search Report for PCT/EP2008/003148.
International Preliminary Examination Report on Patentability for PCT/EP2008/003148.
Office Action mailed Apr. 24, 2012 from Japanese Patent Office for counterpart JP Appl. No. 2010-502469, including English translation thereof.

* cited by examiner

*Primary Examiner* — Justin Holmes
(74) *Attorney, Agent, or Firm* — J-Tek Law PLLC; Jeffrey D. Tekanic

(57) ABSTRACT

A power-dividing gear train assembly for motor vehicles includes a differential that outputs torque to two output shafts. The output torque applied to the output shafts is changeable by using a superimposing gear train, which comprises a plurality of epicyclic gear trains and is drivingly connected indirectly or directly with the output shafts. A drive motor is drivingly coupled to the superimposing gear train and the transmission ratio of the superimposing gear train is set such that an output shaft of the drive motor is still when the output shafts are rotating synchronously. To achieve a more precise and quicker-reacting redistribution of the drive torques, at least one epicyclic gear train, which reduces torque and cooperates with the differential, is connected upstream of the superimposing gear train.

20 Claims, 15 Drawing Sheets

POWER-DIVIDING GEAR TRAIN ASSEMBLY FOR MOTOR VEHICLES

CROSS-REFERENCE

This application is the U.S. national stage filing of International Application No. PCT/EP2008/003148 filed Apr. 18, 2008, which claims priority to German patent application no. 10 2007 017 185.6 filed Apr. 12, 2007.

TECHNICAL FIELD

The invention relates to a power-dividing gear train assembly for motor vehicles.

RELATED ART

Such a power-dividing gear train assembly is described in DE 10 2005 021 023 A1. There, the differential, in this case an axle differential, drives two driven wheels of the motor vehicle via two output shafts. Further, a superimposing gear train formed by two drivingly-coupled planetary gear trains is provided with a drive motor, the output torques to the output shafts being redistributable via the differential by means of said superimposing gear train. The transmission ratios of the superimposing gear train are advantageously set such that the driving shaft of the drive motor is still when the output shafts are rotating synchronously (=straight-ahead driving of the vehicle with no rotational speed difference between the wheels). As this driving condition is prevalent with motor vehicles, an advantageous design is achieved with regard to efficiency and wear of drive parts; moreover, the drive motor can be actuated precisely and quickly from the still state in both rotational directions for redistribution of driving torques.

SUMMARY

It is an object of the invention to improve a power-dividing gear train assembly of the conventional type such that, for an unchanged high transmission efficiency, an even more precise and faster-reacting redistribution of output torques is achieved with a structurally advantageous design of the superimposing gear train and the drive motor.

According to the invention, it is proposed that at least one epicyclic gear train, which reduces torque and interacts with the differential, is connected upstream of the superimposing gear train. When the output shafts are rotating synchronously, the epicyclic gear train rotates as a block, i.e. only slightly diminishing the efficiency of the gear train assembly. The epicyclic gear train succeeds in transmitting, to a large extent, the redirected torque flow T directly via the differential, so that the load on the superimposing gear train is reduced. Further, the dimensions of the superimposing gear train and the drive motor, which may be a hydraulic motor or preferably an electric motor, can be decreased, as smaller control torques are required for the redistribution.

In principle, epicyclic gear trains can be connected to the three shafts of the differential, as proposed, in order to reduce the torques required for redistribution. A plurality of epicyclic gear trains can also be connected to one differential. Instead of, or in addition to, an axle differential, a longitudinal differential may be designed in an appropriate manner as the power-dividing gear train assembly in a four-wheel drive motor vehicle. The differential may be designed as a bevel gear differential, if necessary.

However, the differential is preferably designed in a known manner as a positive-ratio epicyclic gear train, wherein the outer gear is driven and the output shafts are drivingly connected to the planet carrier and the sun gear, respectively, wherein it is of particular structural advantage that at least one planetary gear set of the differential is connected to the superimposing gear train via at least one additional coaxial central gear. By accelerating or decelerating the planetary gear set, a redistribution of the output torque of the differential can be controlled in an advantageous manner. When the planetary gears are accelerated or decelerated by the drive motor, the resulting torque ratio deviates from the transmission ratios of the differential, whereby a torque-vectoring functionality can be produced.

Here, the epicyclic gear train with the differential can be designed as a reduction gear set having only one central gear meshing with a planetary gear set (=4-shaft gear train). The two other elements of the epicyclic gear train are therefore formed by the already-existing output elements of the differential, i.e. the planet carrier and the sun gear. Accordingly, redistributed output torques pass directly via the differential.

In another aspect of the present teachings, couplings of the central gear of the epicyclic gear train with the differential are described that are advantageous in view of structure and transmission ratio.

In an advantageous further development of the invention, two upstream-connected epicyclic gear trains can have two central gears interacting with the differential, which central gears are drivingly connected to the superimposing gear train, wherein the central gears drive the radial-inner or the radial-outer planetary gears as a positive-ratio gear train and as a negative-ratio gear train (=5-shaft gear train).

Alternatively, the central gear may be combined with an epicyclic gear train, which is composed of a sun gear having planetary gears supported on carriers of the sun gear of the differential, which sun gear is connected to the superimposing gear train, and an outer gear forming a structural unit with the central gear. Hence, for still higher transmission ratios, the epicyclic gear train is integrated into the differential as a negative-ratio gear train in a structurally advantageous manner.

Here, it may be particularly advantageous with regard to the structure and manufacturing, if the central gear is designed as an internal-toothed and external-toothed ring gear that meshes in an overhung manner with the outer planet gears of the differential and with the planet gears of the integrated epicyclic gear train.

Alternatively, the central gear can be designed as an internal-toothed ring gear that meshes with the inner planet gears of the differential and with the planet gears of the integrated epicyclic gear train.

Further, the epicyclic gear train can be produced from a combination of two elementary gear trains, two of its three shafts being connected with two of the three shafts of the differential. Here, the two elementary gear trains may be designed as a reduced gear set having one negative-ratio gear train and one positive-ratio gear train or as a negative-ratio gear train. In this way, it is achieved that especially high transmission ratios (=especially low torque flows in the superimposing gear train and the drive motor) can be provided.

In a further embodiment of the invention, the superimposing gear train may be formed of two interconnected planetary gear trains, which are drivingly connected to the drive motor via an element and are supported in a fixed manner relative to the housing via a further element, and which effect the torque distribution via the epicyclic gear train and the differential.

In particular, the epicyclic gear train and the superimposing gear train can be designed in a manner, which is especially advantageous with regard to the structure and manufacturing, as one structural unit with the differential, to which structural unit the drive motor is attached. In this way, drive couplings of the sub-gear trains can be implemented especially easily.

BRIEF DESCRIPTION OF THE DRAWING

Several exemplary embodiments of the invention are described below with further details and advantages. The schematic drawings show in.

DETAILED DESCRIPTION OF THE INVENTION

Figure 1:
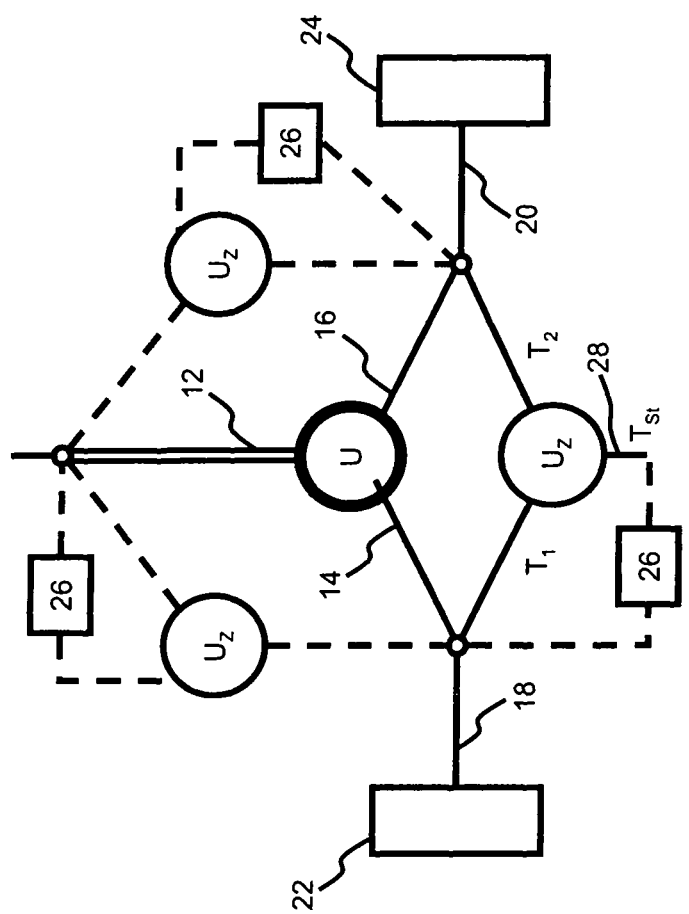
FIG. 1 a power-dividing gear train assembly for motor vehicles having a possible arrangement of its superimposing gear train with an epicyclic gear train connected upstream of the drive motor, utilizing Wolf symbolic representations.

In FIG. 1, a power-dividing gear train assembly for motor vehicles is illustrated utilizing Wolf symbolic representations, which power-dividing gear train assembly can be used as a longitudinal differential (in four-wheel-drive motor vehicles) and/or as a transverse differential and an axle differential, respectively.

In the exemplary embodiment, the power-dividing gear train assembly has an axle differential U, which is designed as a still-to-be-described epicyclic gear train or rather a planetary gear train, whose input shaft 12 distributes the driving torque generated by a drive source of the motor vehicle to the two output shafts 14, 16 and from these via universal joint shafts 18, 20 to the driven wheels 22, 24 of the motor vehicle.

A torque-reducing epicyclic gear train $U_z$ is drivingly connected between the two output shafts 14, 16 and is connected to an attached drive motor via at least one input shaft 28 with a downstream, still-to-be-described superimposing gear train 26. The superimposing gear train 26 is coupled back to one of the output shafts 14, 16 for redistribution of the output torque. Due to the epicyclic gear train $U_z$, the to-be-redistributed output torque $T_1$, $T_2$ is reduced to $T_{St}$, wherein $T_{St} \ll T_1, T_2$.

Instead of the epicyclic gear train $U_z$ between the output shafts 14, 16, shown by solid lines in FIG. 1, the epicyclic gear train $U_z$ (according to the broken lines) having the downstream-connected superimposing gear train 26 can also be drivingly arranged between the input shaft 12 and the output shafts 14 or 16. Moreover, multiple epicyclic gear trains $U_z$ can also be used simultaneously, if required.

It should be noted that the terms "...shafts" and "drivingly connected" also are understood to include the epicyclic gear train elements of the differential U connected with said shafts, the additional epicyclic gear trains $U_z$ and the superimposing gear train 26, as is also readily derivable from the following figures.

Figure 2:
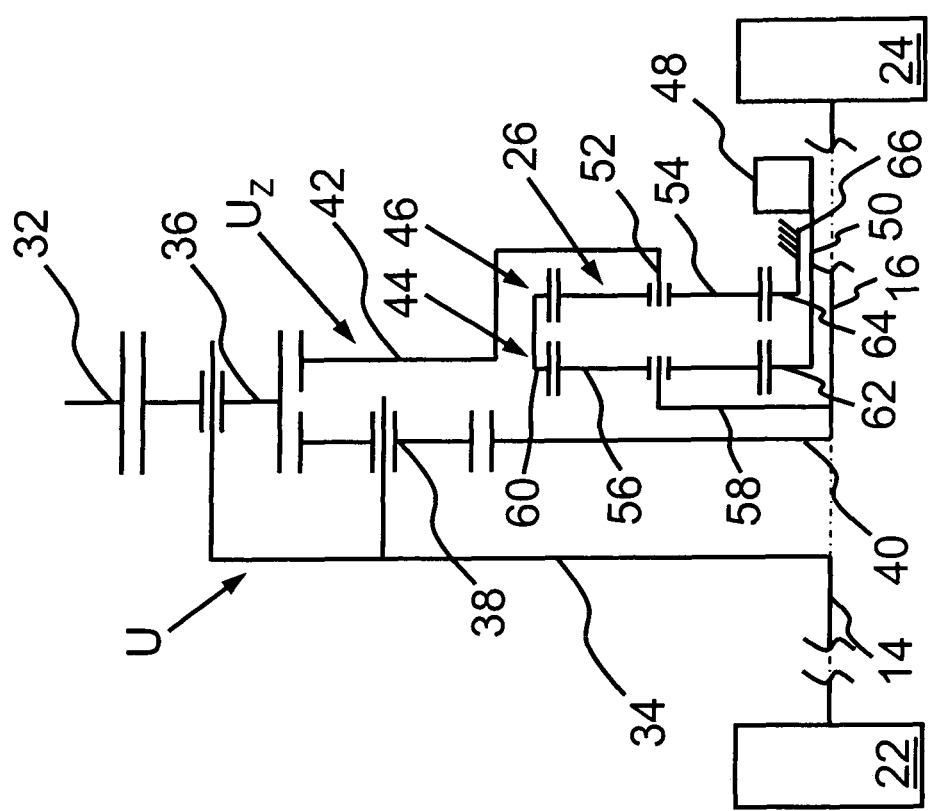
FIG. 2 a power-dividing gear train assembly for motor vehicles having an axle differential designed as a positive-ratio gear train, an epicyclic gear train with an external-toothed central gear depicted as a reduced coupled gear set and a superimposing gear train having an electric motor.

In the structural embodiment, FIG. 2 shows the axle differential U as a known positive-ratio planetary gear train having a driven outer gear 32 (cf. input shaft 12 of FIG. 1), an output planet carrier 34 (cf. output shaft 14 of FIG. 1) having radial-outer planet gears 36 and radial-inner planet gears 38 and a central sun gear 40 (cf. output shaft 16 in FIG. 1). The planet gears 36 mesh with the outer gear 32 and the planet gears 38; additionally, the planet gears 38 are in engagement with the sun gear 40.

Moreover, an external-toothed central gear 42 is provided, which is connected with the superimposing gear train 26 that is integrated into the power-dividing gear train assembly as presented below, and which is in engagement with the planet gears 36 of the differential U.

Consequently, the central gear 42, together with the already-existing elements of the planet carrier 34 and sun gear 40 of the differential U, forms a reduced coupled gear set or the epicyclic gear train assembly $U_z$, which is drivingly connected with the superimposing gear train 26. Due to the integration of the epicyclic gear train $U_z$, the power flow can be changed already in the differential U, without having to use additional power-guiding components. This results in a substantial reduction of costs and weight and increases the operational reliability of the power-dividing gear train assembly.

According to FIG. 2, the superimposing gear train 26 is composed of two drivingly-coupled planetary gear trains 44, 46, which interact with an attached drive motor or rather an electric motor 48. The transmission ratio of the planetary gear trains 44, 46 or the superimposing gear train 26 is set so that the drive shaft 50 of the electric motor 48 does not rotate during synchronous rotation of the output shafts 14, 16.

Here, the central gear 42 of the epicyclic gear train $U_z$ also forms the planet carrier 52 of the planetary gear train 46 having the planet gears 54, while the planet gears 56 of the planetary gear train 44 are rotatably supported on a planet carrier 58 that is drivingly connected with the output shaft 16.

The planet gears 54, 56 of the planetary gear trains 44, 46 mesh with a common outer gear 60 and each one meshes with a respective sun gear 62, 64. Here, the sun gear 64 of the planetary gear train 46 is fixedly supported relative to the housing at 66, whereas the sun gear 62 is connected with the drive shaft 50 of the electric motor 48.

Figure 3:
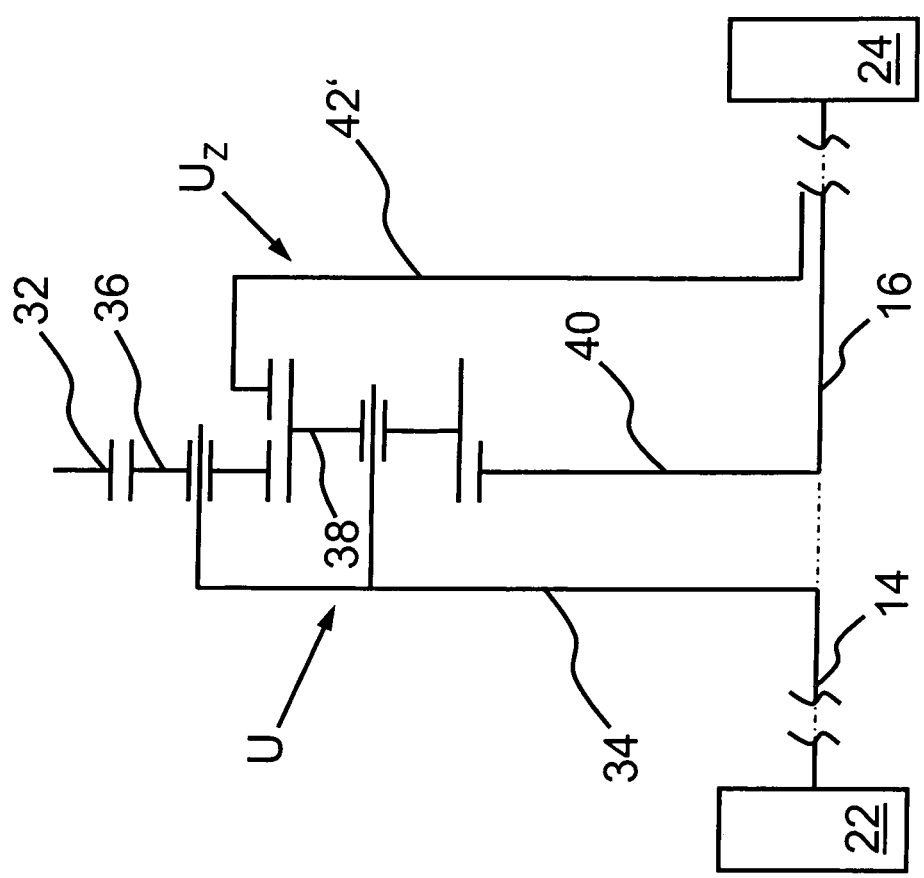
FIG. 3 the power-dividing gear train assembly according to FIG. 2, however with an internal-toothed annulus gear as a central gear.

FIG. 3 shows a power-dividing gear train assembly corresponding to FIG. 2, which is described only as far as it differs from FIG. 2. Here, the central gear 42' is formed as an inner-toothed annulus gear, which does not mesh with the radial-outer planet gears 36, but rather with the inner planet gears 38 of the planet carrier 34. The function and the connection to the superimposing gear train 26 correspond to FIG. 2.

Figure 4:
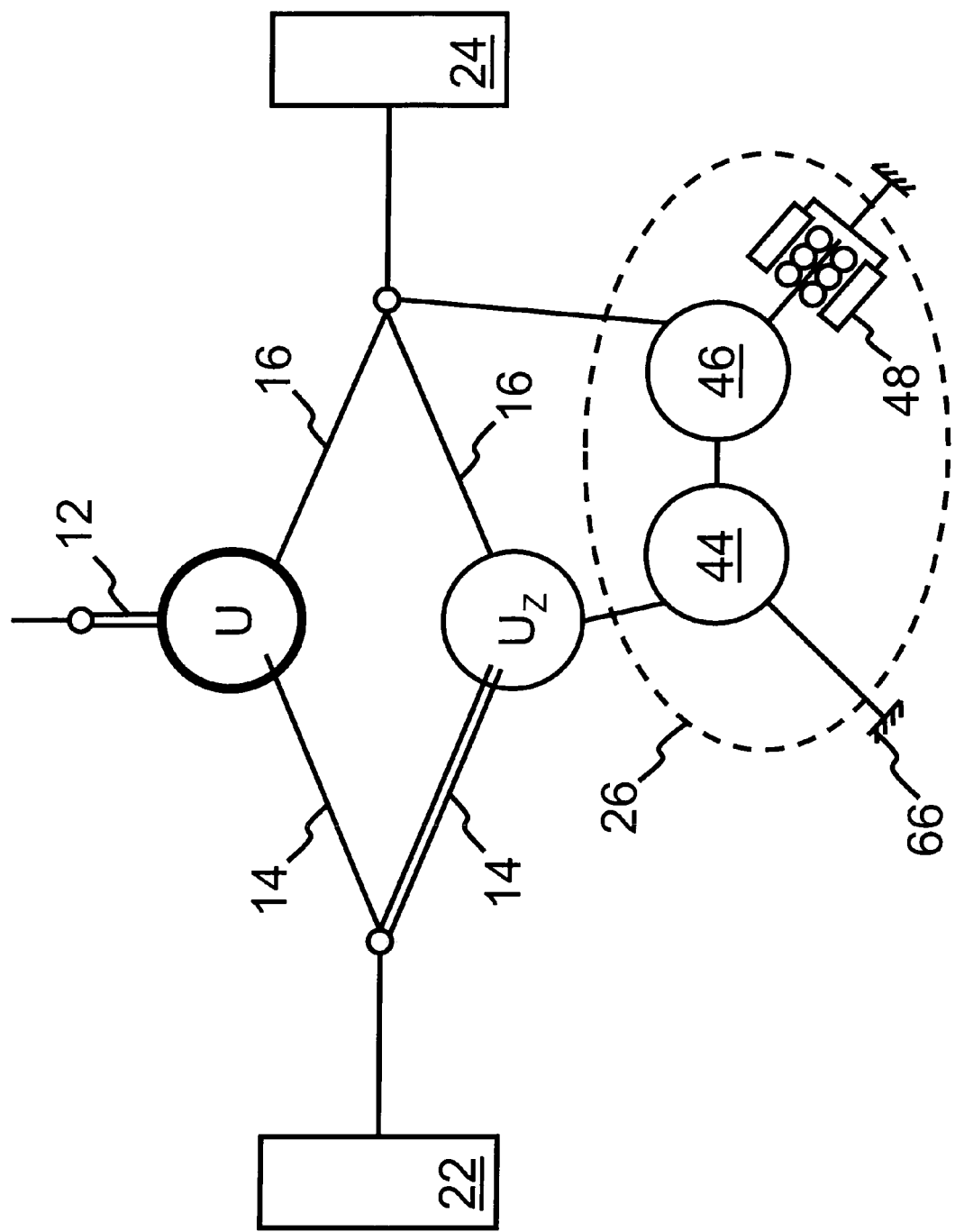
FIG. 4 the power-dividing gear train assembly according to FIGS. 2 and 3 and the superimposing gear train as Wolf symbolic representations.

FIG. 4 shows the power-dividing gear train assemblies U and $U_z$ having superimposing gear train 26, which correspond to FIGS. 2 and 3, as Wolf symbolic representations. The summation shaft (shown as a double line) of the reduced negative-ratio gear train $U_z$ is identical to the planet carrier 34 of the differential U. As is further apparent, the output shaft 14 and the output shaft 16 of the differential U are identical to the delineated output shafts 14, 16 of the reduced epicyclic gear train $U_z$.

Figure 5:
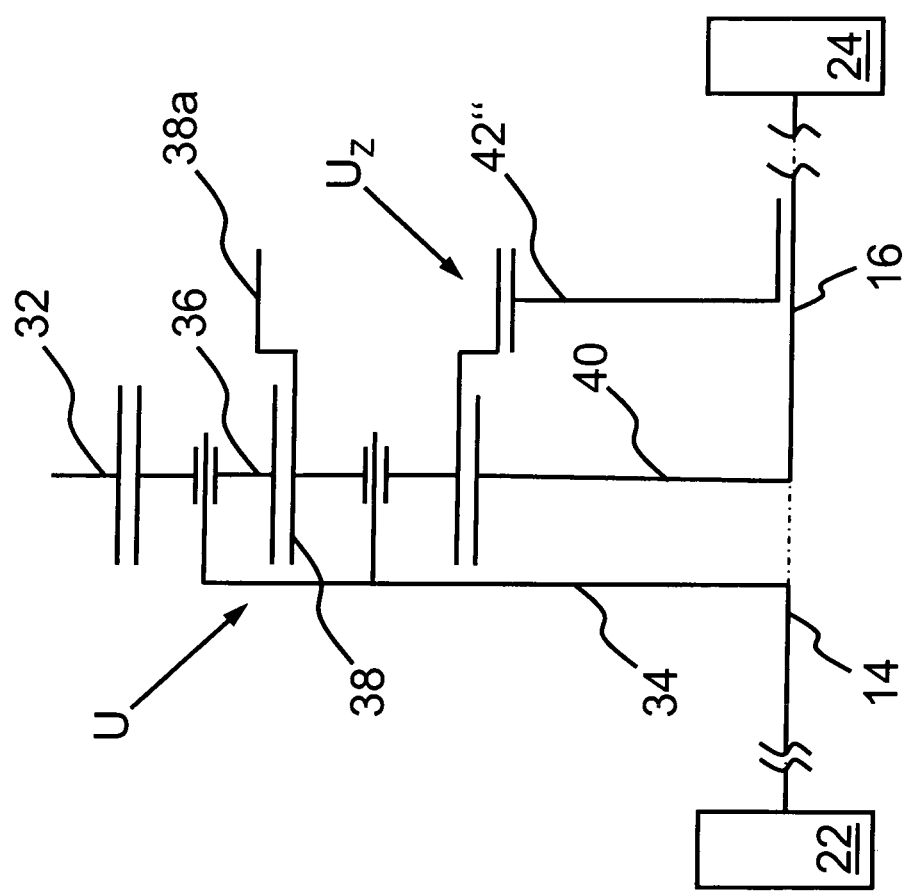
FIG. 5 the power-dividing gear train assembly according to FIG. 2, wherein the central gear meshes with additional planet gears that are integrally formed with a planetary gear set of the differential.
Figure 6:
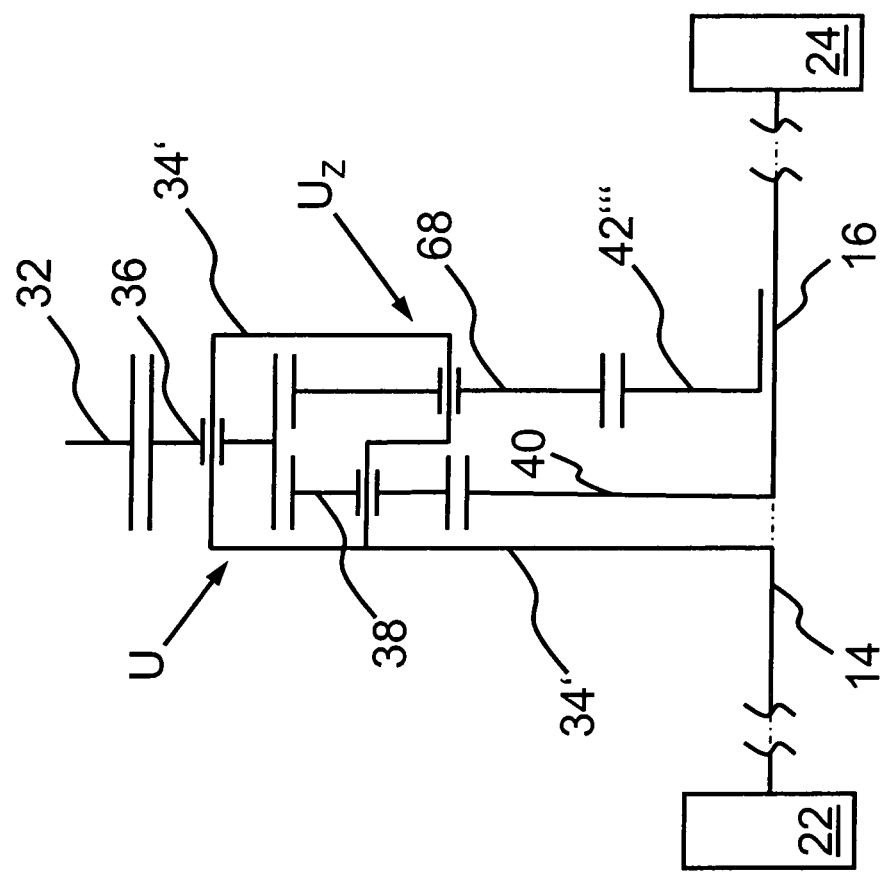
FIG. 6 the power-dividing gear train assembly according to FIG. 2, wherein the external-toothed central gear meshes with planet gears that are separately supported on the planet carrier of the differential.

FIGS. 5 and 6 show further power-dividing gear train assemblies, which are described only as far as they substantially differ from the above-presented power-dividing gear train assemblies. Parts having the same functions are provided with the same reference numerals.

According to FIG. 5, the external-toothed central gear 42" meshes with planet gears 38a that are coaxially arranged on the inner planet gears 38 of the differential U or rather the planet carrier 34, wherein the pitch circle diameter of the planet gears 38a is different from the adjacent planet gears 38. This enables a further torque reduction via the epicyclic gear train $U_z$ by using structurally simple means.

According to FIG. 6, the central gear 42''' is in engagement with further planet gears 68, which also mesh with the outer planet gears 36 of the planet carrier 34. As is apparent, the planet gears 68 are also rotatably supported on the planet carrier 34'. The interleaved connection of the further planet gears 68 enables a still further design of the torque reduction of the additional epicyclic gear train $U_z$.

Figure 7:
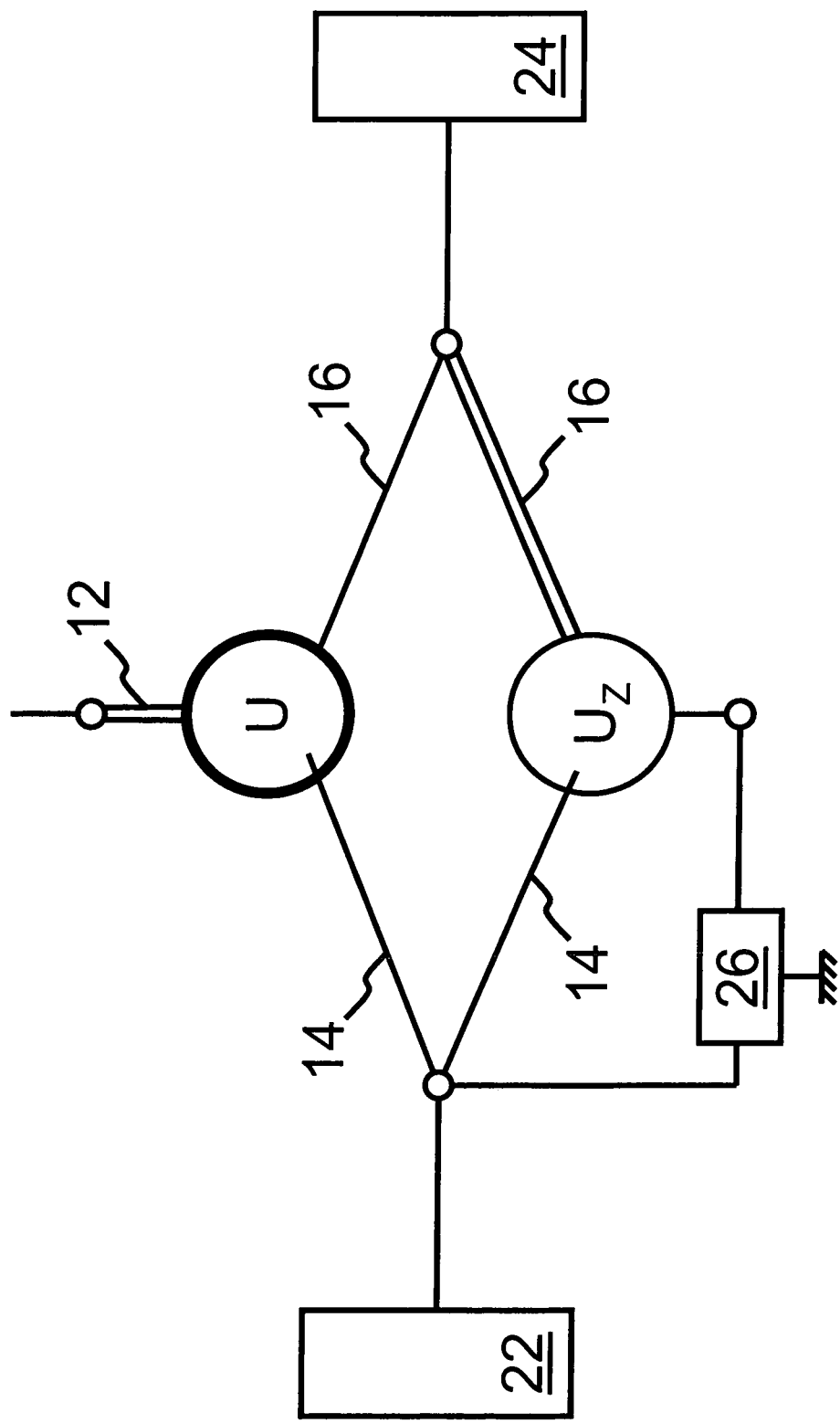
FIG. 7 the power-dividing gear train assembly according to FIGS. 5 and 6 as Wolf symbolic representations.

As is apparent from the Wolf symbolic representations according to FIG. 7, the summation shaft (double line) of the reduced positive-ratio gear train assembly $U_z$ shown herein is identical with the sun gear 40.

Figure 8:
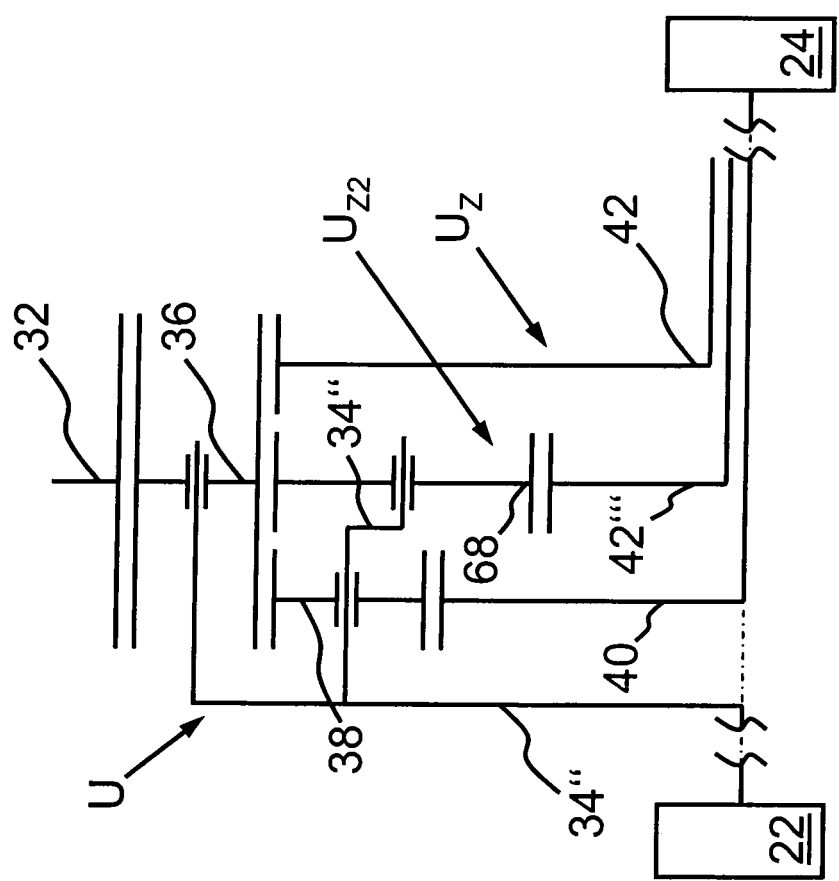
FIG. 8 a power-dividing gear train assembly having a differential and an epicyclic gear train with two central gears that are drivingly connected with the superimposing gear train.

FIG. 8 shows a further alternative power-dividing gear train assembly, which is described only as far as it substantially differs from the preceding embodiments. Same parts are provided with the same reference numerals.

According to FIG. 8, two additional epicyclic gear trains $U_z$ and $U_{z2}$ are provided, which have two central gears 42, 42''' interacting with the differential U. The central gears 42, 42''' are drivingly connected with the superimposing gear train 26 (not illustrated). Here, the one external-toothed central gear 42''' meshes with planet gears 68 that are separately supported on the single planet carrier 34'' of the differential U in order to form a positive-ratio gear train, which planet gears 68 also mesh with the radial-outer planet gears 36 of the differential U. The other external-toothed central gear 42 acts directly on the outer planet gears 36 as a negative-ratio gear train.

Due to the integration of the two epicyclic gear train $U_z$ and $U_{z2}$ into the differential U, the transmission ratio at the electric motor 48 is further increased or rather the control torque is further reduced. If opposing torques are applied to the two central gears 42, 42''', the inner planet gears 38 will be driven "doubly" in one direction and, therefore, the torque distribution of the differential U is accordingly affected.

Instead of the depicted embodiment according to FIG. 8, the drive coupling with the two central gears 42 can also be designed with the radial-inner planet gears 38 in connection with a set of reverse planet gears 68.

Figure 9:
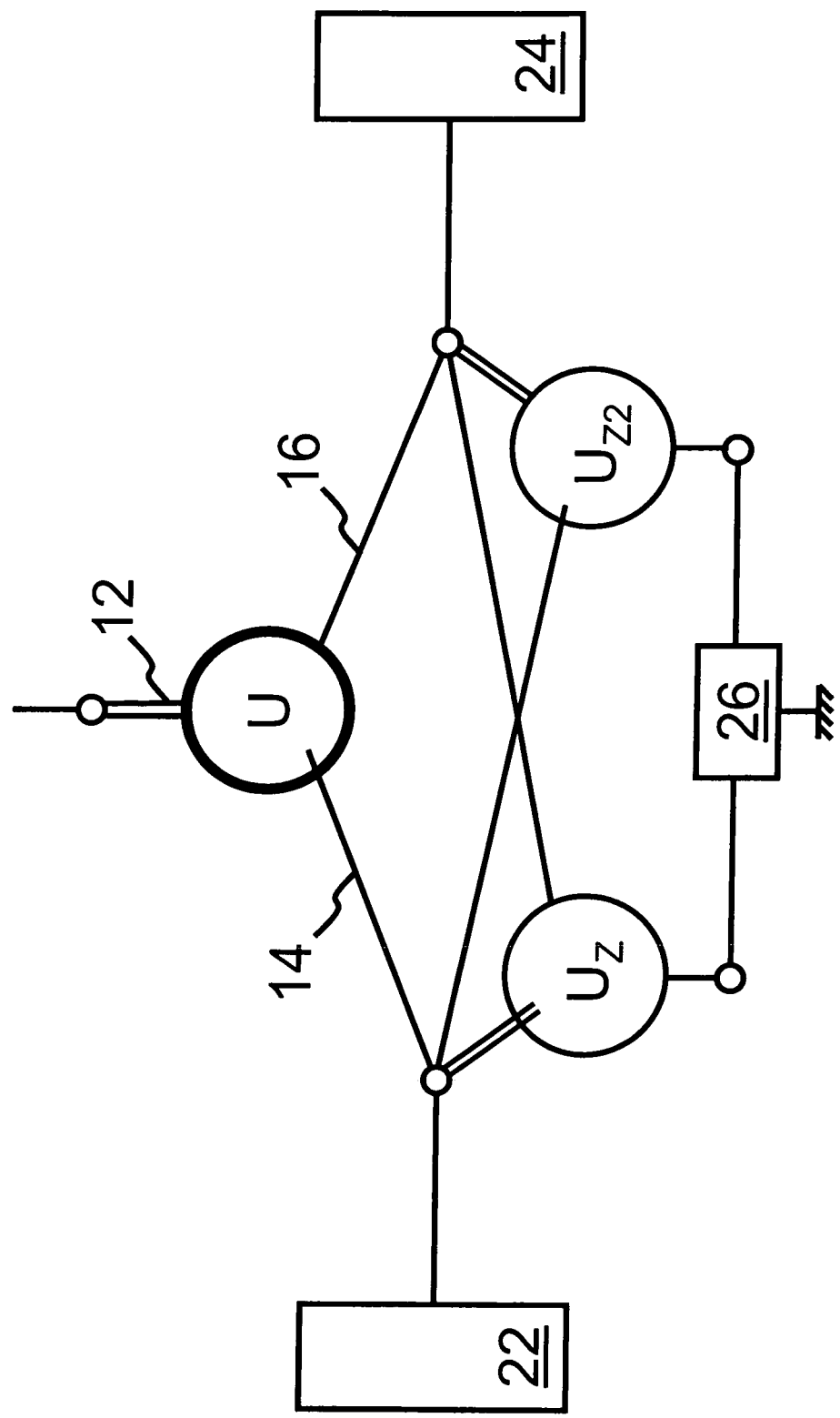
FIG. 9 the resulting Wolf symbolic representations of the power-dividing gear train assembly according to FIG. 8.

FIG. 9 shows the Wolf symbolic representation for the power-dividing gear train assembly according to FIG. 8 in the described version, or in versions derived therefrom.

Figure 10:
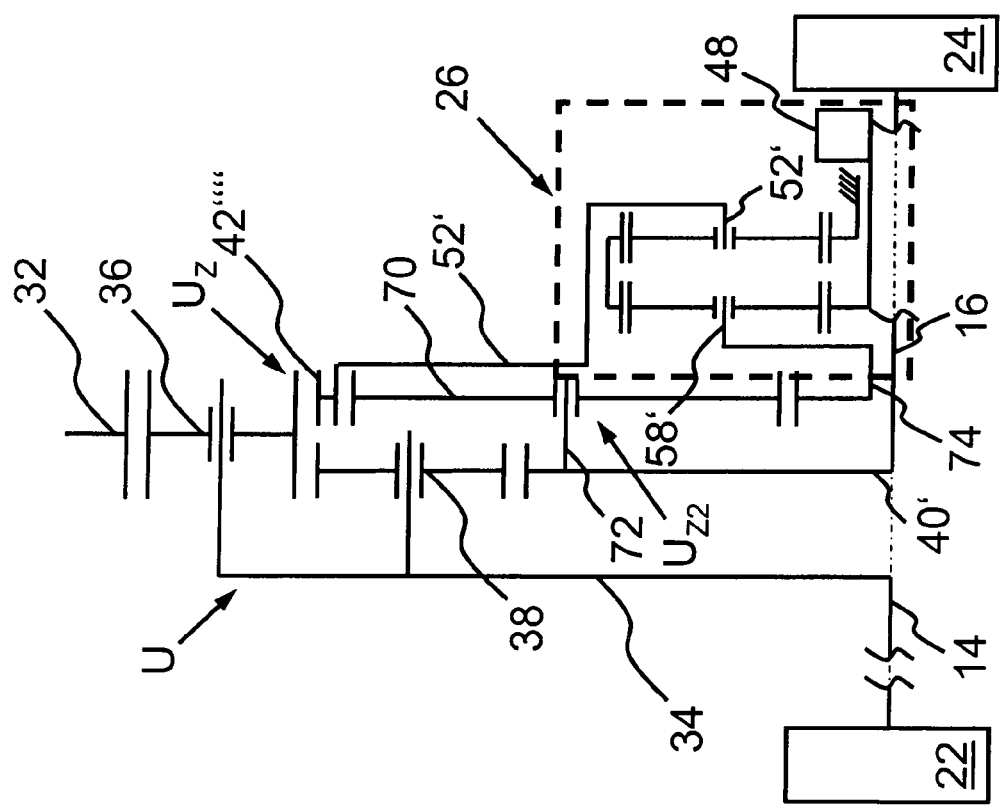
FIG. 10 a power-dividing gear train assembly having a differential and an epicyclic gear train, wherein a further epicyclic gear train designed as a negative-ratio gear train is integrated into the central gear designed as a ring gear, and which has a downstream superimposing gear train.
Figure 11:
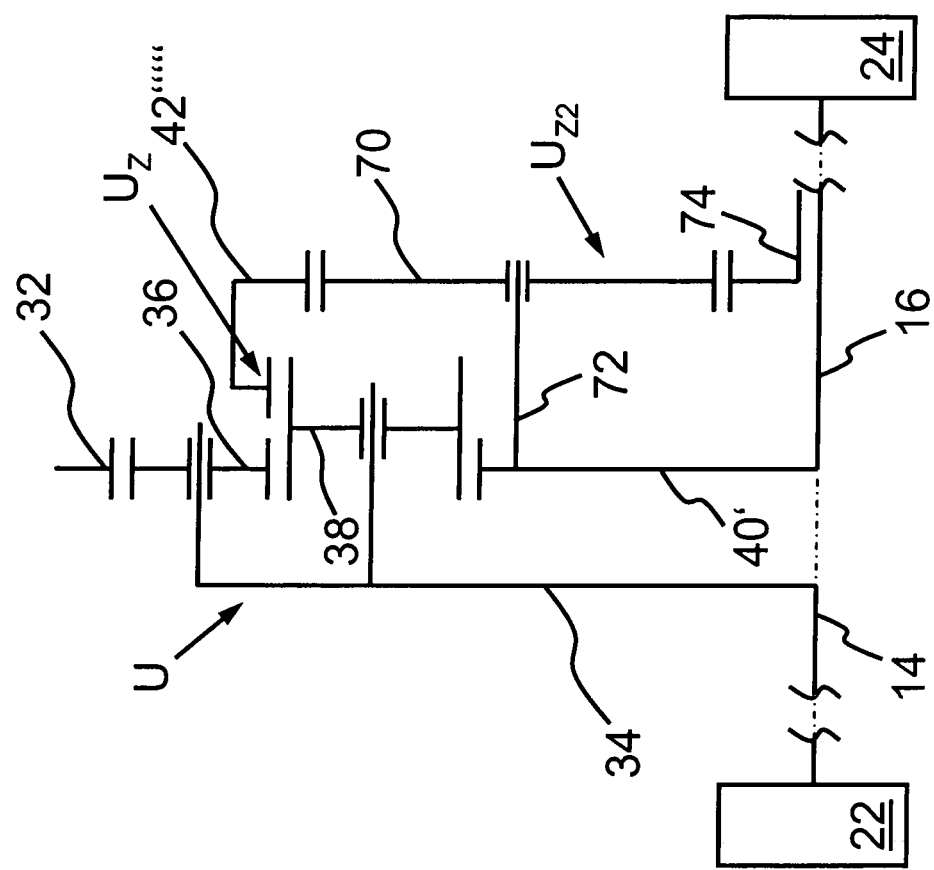
FIG. 11 the power-dividing gear train assembly according to FIG. 10, wherein the central gear is formed, however, as an internal-toothed annulus gear, which meshes with the inner planetary gears of the differential and the planet gears of the integrated epicyclic gear train.

FIGS. 10 and 11 show further alternative power-dividing gear train assemblies, which are again described only as far as they substantially differ from the preceding embodiments. Parts having the same functions are provided with the same reference numerals.

According to FIG. 10, the central gear specified with the preceding reference numeral 42 is designed as an internal- and external-toothed ring gear 42'''', which meshes in an overhung manner with the outer planet gears 36 of the differential U and, functioning as an internal-toothed outer gear, with the planet gears 70 of a further, integrated epicyclic gear train $U_{z2}$. The planet gears 70 are rotatably supported on carriers 72 that are attached to the sun gear 40'. The sun gear 74 of the second epicyclic gear train $U_{z2}$ is also the planet carrier 58' of the superimposing gear train 26. Further, the ring gear 42'''' of the epicyclic gear train $U_z$ forms the additional planet carrier 52' of the superimposing gear train 26 which, apart from that, is designed according to FIG. 2 and is not described again.

Due to the use of the second complete epicyclic gear train $U_{z2}$, an even higher transmission ratio for the electric motor 48 results. Now there is a second running carrier 72, but this is identical with the sun gear 40' of the differential U. As a result of this, a very simple construction is possible. The efficiency is very good with regard to the realizable transmission ratio. The concept has a very narrow axial structure and consists of relatively few components.

Unlike in FIG. 10, the central gear in FIG. 11 is designed as an internal-toothed annulus gear 42''''', which meshes with the radial-inner, broadened planet gears 38 of the differential U and with the planet gears 70 of the integrated epicyclic gear train assembly $U_{z2}$.

Figure 12:
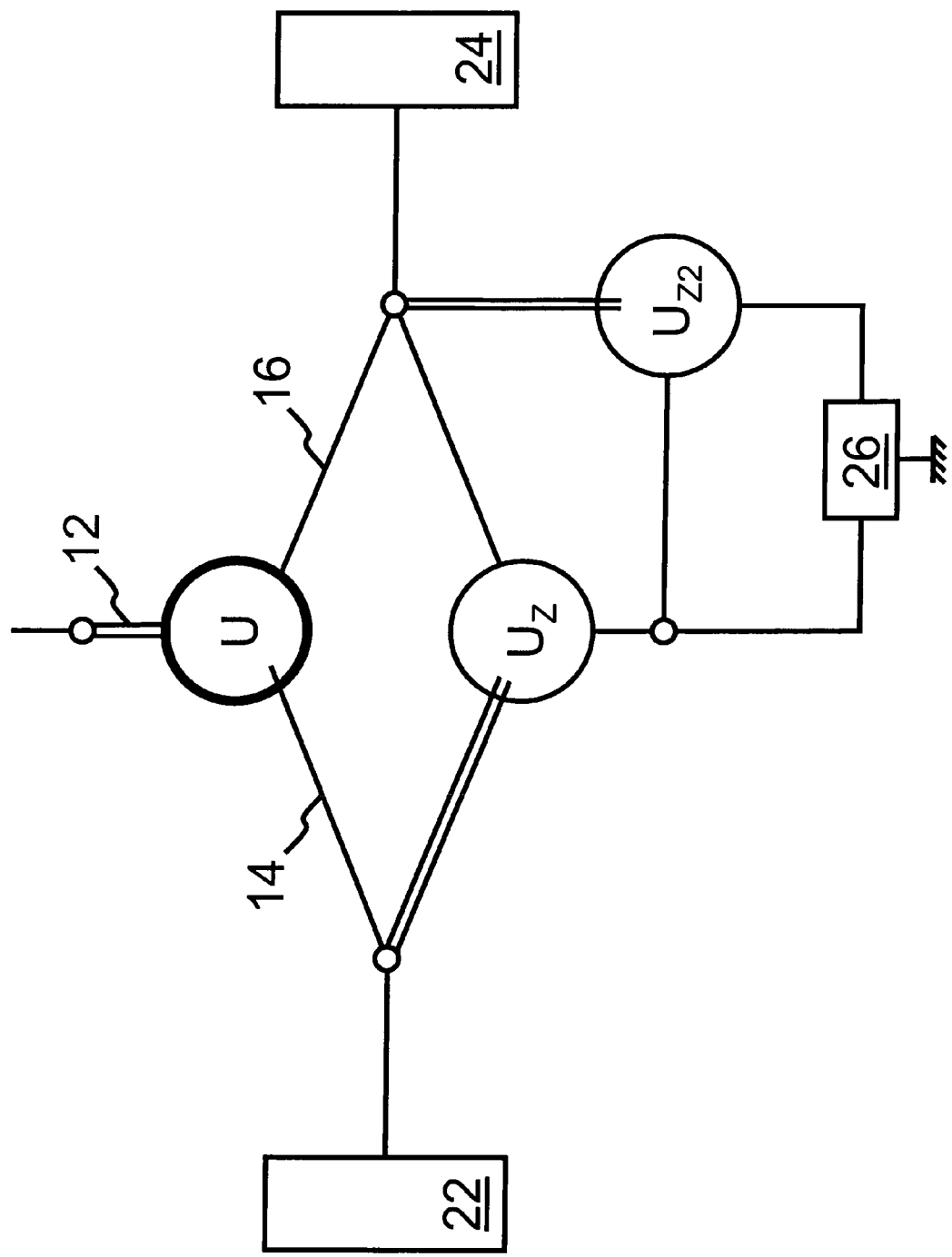
FIG. 12 the power-dividing gear train assembly according to FIGS. 10 and 11 as Wolf symbolic representations.

FIG. 12, in turn, shows the Wolf symbols according to FIGS. 10 and 11 for a better overview of the gear train couplings.

Figure 13:
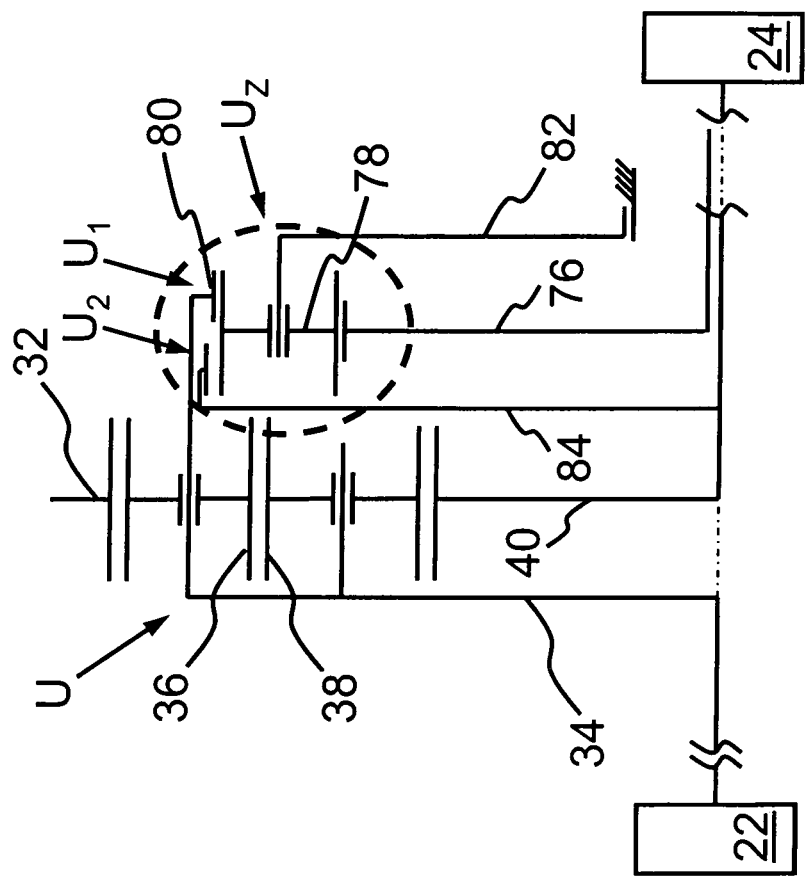
FIG. 13 a further power-dividing gear train assembly having a differential, wherein the planetary gear train is composed of the combination of two elementary gear train assemblies, two of its three shafts being respectively connected with two of the three shafts of the differential.
Figure 14:
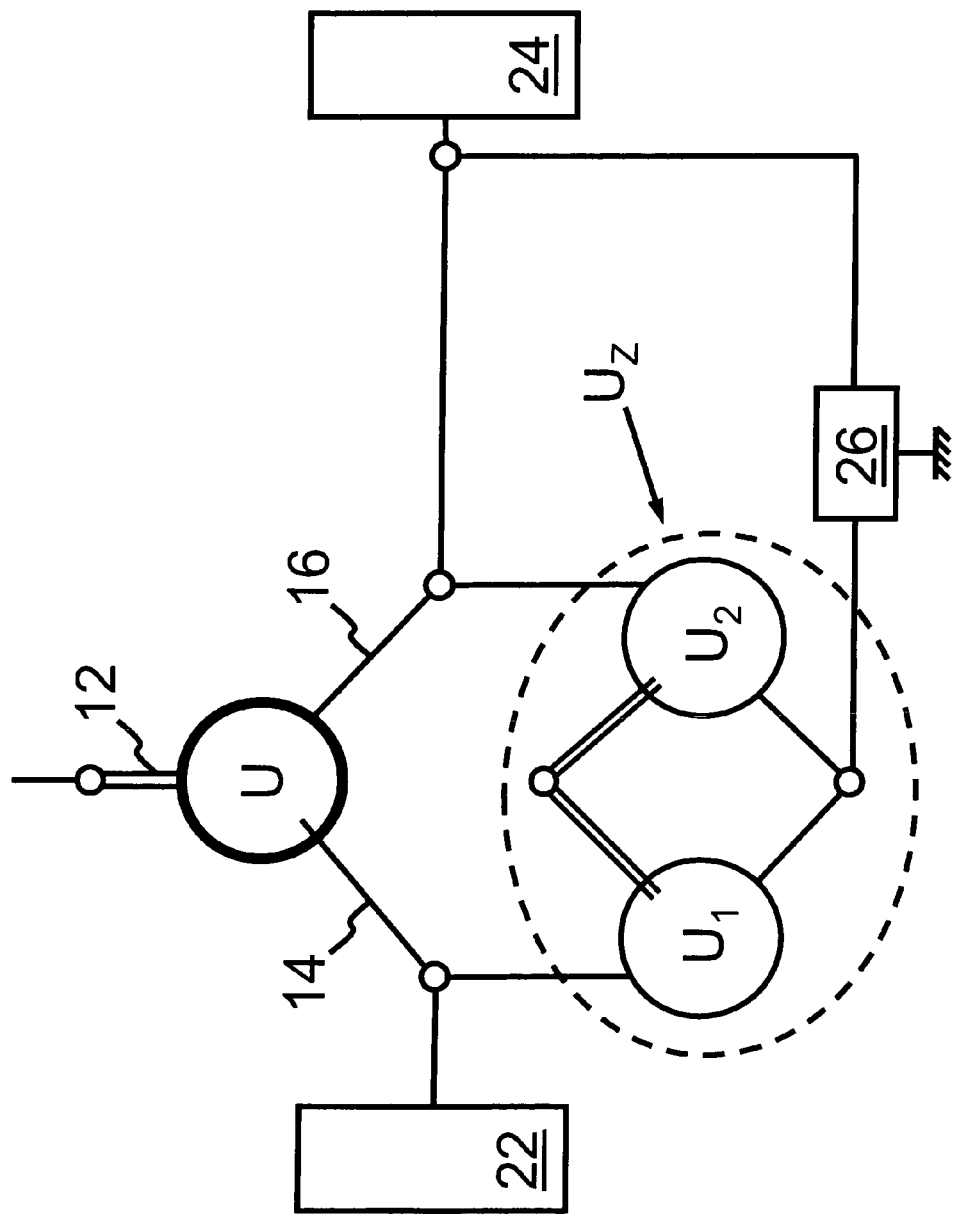
FIG. 14 the power-dividing gear train assembly according to FIGS. 13 and 15 as Wolf symbolic representations.
Figure 15:
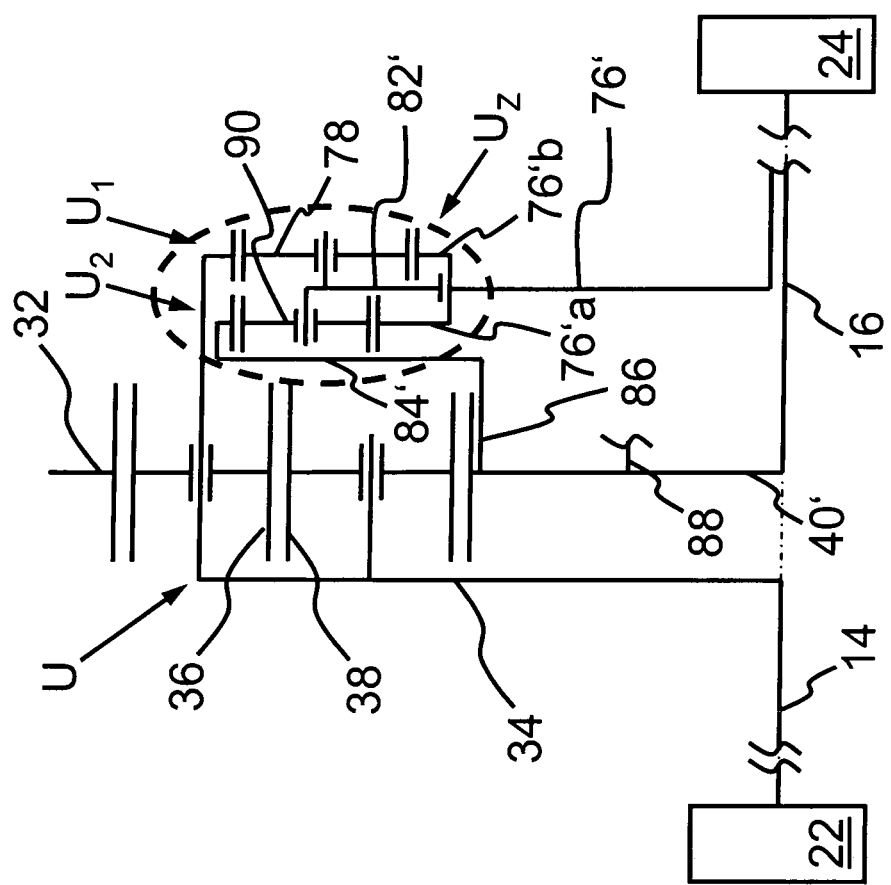
FIG. 15 the power-dividing gear train assembly according to FIG. 13, wherein the epicyclic gear train is again produced from a combination of two elementary gear trains.

Power-dividing gear train assemblies are described with FIGS. 13 to 15, in which the epicyclic gear train $U_z$ is produced from the combination of two elementary gear trains $U_1$ and $U_2$, two of its three shafts being connected with two of the three shafts of the differential U.

According to FIG. 13, the two elementary gear trains are designed as a reduced gear set with two negative-ratio gear trains $U_1$ and $U_2$.

Accordingly, the sun gear 76 of the negative-ratio gear train $U_1$ is identical with that of the negative-ratio gear train $U_2$. The planet gears 78 mesh with the sun gear 76 and the outer gear 80. This is connected to the planet carrier 34 of the differential U. The planet carrier 82 of the planet gears 78 rotates freely.

The second elementary gear train $U_2$ has an outer gear 84, which is also drivingly connected with the sun gear 76 via the planet gears 78. The planet carrier 82 is shared by the elementary drives U1 and U2.

The two elementary drives $U_1$ and $U_2$, in turn, are drivingly coupled to the superimposing gear train 26 (corresponding to FIG. 2), wherein the outer gear 84 also represents the planet carrier 58 and the sun gear 76 also represents the planet carrier 52.

The complete epicyclic gear trains $U_1$ and $U_2$ are arranged coaxially in a structurally and spatially advantageous manner. The outer gear 84 of the negative-ratio gear train $U_2$ is connected with the planet carrier 58 of the epicyclic gear train 44 (corresponding to FIG. 2) to form one unit. Moreover, the sun gear 76 of the negative-ratio gear train $U_1$ is integrally designed with the planet carrier 52 of the epicyclic gear train 46.

The described arrangement and coupling of the elementary gear trains $U_1$ and $U_2$ allows for the provision of a particularly effective torque-reducing gear train combination $U_z$ with a high transmission ratio, which ensures a very precise, smooth redistribution of the output torque to the wheels 22, 24 of the motor vehicle, if a fast rotating electric motor 48 is used with correspondingly low driving torque.

FIG. 14, in turn, shows the Wolf symbolic representation corresponding to the power-dividing gear train assembly according to FIG. 13.

Alternatively to FIG. 13, FIG. 15 shows an embodiment of the power-dividing gear train assembly with two elementary gear trains, both being designed as negative-ratio gear trains $U_1$ and $U_2$. The power-dividing gear train assembly is described only as far as it substantially differs from the embodiment according to FIG. 13. Parts having the same function are provided with the same reference numerals.

Unlike in FIG. 13, the outer gear 84' of the elementary gear train $U_2$ in FIG. 15 is connected to the sun gear 40' of the differential U via a shaft 86, on which sun gear 40' the planet gears 56 of the epicyclic gear train 44 of the superimposing gear train 26 are also rotatably supported via a carrier 88 (according to FIG. 2).

The planet gears 78 of the elementary gear train $U_1$ are supported on the common planet carrier 82' with the planet gears 90 of the epicyclic gear train $U_2$. The planet gears 90 mesh with the sun gear 76'$a$; the planet gears 78 mesh with the sun gear 76'$b$. The shaft 76 shared by the sun gears 76'$a$ and 76'$b$ interacts with the superimposing gear train 26.

The Wolf symbolic representation of the power-dividing gear train assembly according to FIG. 15 corresponds again to FIG. 14.

Based on the exemplary embodiments described above, other couplings of the elementary gear trains $U_1$ and $U_2$ are also designable in accordance with the required efficiencies and transmission ratios.

When the output shafts 14, 16 are rotating synchronously, the epicyclic gear trains U and $U_z$ or $U_1$, $U_2$ rotate as a block, i.e. there is no loss of efficiency due to rolling-off. As this driving state occurs predominately in motor vehicles, the teeth of the gear elements may be implemented in a less expensive manner, e.g., as simple, robust straight teeth.

The teeth of the superimposing gear train 26, on the contrary, are designed to be quieter (e.g. helical teeth) and with good rolling-off characteristics. Due to the torque-reducing connection of the superimposing gear train 26, the structure may be designed lighter; the same applies to the drive motor, which may be implemented as a hydraulic motor or preferably an electric motor. If necessary, the gears as well as the other gear train elements of the superimposing gear train 26, including the not-illustrated housings, may be made, at least partially, of high strength plastic. As gears made of plastic run quieter, straight teeth could also be used for the superimposing gear train 26, if necessary.

The invention claimed is:

1. A power-dividing gear train assembly for motor vehicles, comprising:
    a differential having at least one input shaft and at least first and second output shafts,
    a superimposing gear train comprising a plurality of epicyclic gear trains drivingly connected indirectly or directly with at least one of the first and second output shafts and a drive motor drivingly coupled to the epicyclic gear trains, the superimposing gear train being arranged and constructed to change output torque at the first and second output shafts, wherein the superimposing gear train has a transmission ratio that is set such that the drive motor is still when the first and second output shafts are rotating synchronously, and
    at least one torque-reducing epicyclic gear train having three shafts, wherein two of said shafts are respectively connected to two shafts of the differential and the at least one torque-reducing epicyclic gear train is connected upstream of the superimposing gear train.

2. A power-dividing gear train assembly according to claim 1, wherein the superimposing gear train comprises two interconnected planet gear trains that are drivingly connected with the drive motor via a first element and are supported in a fixed manner relative to a housing via a second element, the two interconnected planet gear trains influencing torque distribution via the epicyclic gear train and the differential.

3. A power-dividing gear train assembly according to claim 1, wherein the epicyclic gear train and the superimposing gear train are designed as one structural unit with the differential and wherein the drive motor is attached to the structural unit.

4. A power-dividing gear train assembly according to claim 1, wherein the drive motor comprises an electric motor.

5. A power-dividing gear train assembly according to claim 1, wherein the drive motor comprises a hydrostatic motor.

6. A power-dividing gear train assembly according to claim 1, wherein the epicyclic gear train is a combination of two elementary gear trains forming a reduced gear set.

7. A power-dividing gear train assembly according to claim 6, wherein the two elementary gear trains form a negative-ratio gear train.

8. A power-dividing gear train assembly according to claim 1, comprising first and second upstream-connected epicyclic gear trains having two respective central gears, wherein the two central gears are drivingly connected to the superimposing gear train and the two central gears respectively drive at least one radial-inner planet gear and at least one radial-outer planet gear of the differential as a negative-ratio gear train and a positive-ratio gear train, respectively.

9. A power-dividing gear train assembly according to claim 8, wherein the central gears have external teeth, one of the central gears meshes with planet gears that are separately supported on a planet carrier of the differential, which planet gears of the differential are also in engagement with radial-outer planet gears of the differential, and the other central gear directly drives the radial-outer planet gears of the differential.

10. A power-dividing gear train assembly according to claim 1, wherein the at least one torque-reducing epicyclic gear train shares one or more gears with the differential and has a central gear that directly or indirectly meshes with at least one planet gear of the differential.

11. A power-dividing gear train assembly according to claim 10, wherein the central gear is combined with an epicyclic gear train that comprises:
    a sun gear connected to the superimposed gear train,
    planet gears supported on carriers of a sun gear of the differential, and
    an annulus gear forming a structural unit with the central gear.

12. A power-dividing gear train assembly according to claim 11, wherein the central gear is a ring gear having internal teeth and external teeth, the central gear meshing with outer planet gears of the differential in an overhung manner and meshing with the planet gears of the epicyclic gear train.

13. A power-dividing gear train assembly according to claim 11, wherein the central gear is an internal-toothed annulus gear and meshes with inner planet gears of the differential and meshes with planet gears of the epicyclic gear train.

14. A power-dividing gear train assembly according to claim 11, wherein the epicyclic gear train is a combination of two elementary gear trains forming a reduced gear set.

15. A power-dividing gear train assembly according to claim 14, wherein the two elementary gear trains form a negative-ratio gear train.

16. A power-dividing gear train assembly according to claim 1, wherein the differential is a positive-ratio epicyclic gear train having at least an annulus gear, a planet carrier and a sun gear, wherein the annulus gear is constructed to be driven, one of the first and second output shafts of the differential is drivingly connected with the planet carrier and the other of the first and second output shafts of the differential is connected with the sun gear, and at least one planetary gear set is indirectly or directly connected with the superimposing gear train via at least one additional coaxial central gear.

17. A power-dividing gear train assembly according to claim 16, wherein the central gear is an external-toothed spur gear that meshes with radial-outer planet gears of the differential.

18. A power-dividing gear train assembly according to claim 16, wherein the central gear is an internal-toothed ring gear that interacts with radial-inner planet gears of the differential.

19. A power-dividing gear train assembly according to claim 16, wherein the central gear has external-teeth and meshes with planet gears that are coaxially arranged on inner planet gears of the differential, wherein the coaxially-arranged planet gears have a pitch circle diameter that differs from the pitch circle diameter of the inner planet gears.

20. A power-dividing gear train assembly according to claim 16, wherein the central gear has external-teeth and meshes with planet gears that are separately supported on a planet carrier of the differential, the planet gears being in engagement with radial-outer planet gears of the differential.

* * * * *